United States Patent Office 3,433,771
Patented Mar. 18, 1969

3,433,771
POLYURETHANE ADHESIVES BASED ON DI-
ISOCYANATES AND AN EPOXY ESTER-
DIBASIC ACID ADDUCT
Joseph A. Vasta, Woodbury, N.J., assignor to E. I. du
Pont de Nemours and Company, Wilmington, Del., a
corporation of Delaware
No Drawing. Filed Dec. 2, 1965, Ser. No. 511,227
U.S. Cl. 260—77.5                                3 Claims
Int. Cl. C08g 22/10

ABSTRACT OF THE DISCLOSURE

Polyurethanes made by reacting a dibasic acid, a compound represented by the formula

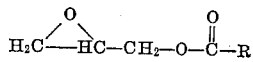

where R is an alkyl radical of 1–26 carbon atoms, and an organic diisocyanate, useful as adhesives.

---

This invention relates to polyurethanes and to processes and polyester intermediates used to prepare these polyurethanes. It is more particularly directed to polyester polyurethanes which are products of successively reacting (A) at least one of
   (1) a saturated aliphatic dibasic acid of 2 through 36 atoms;
   (2) hexahydrophthalic acid;
   (3) a phthalic acid (any isomer) or a phthalic acid (any isomer) substituted with one to 4 halogen atoms; or
   (4) mixtures of these acids with phthalic anhydride, succinic anhydride or dodecyl succinic anhydride;
(B) at least one of a compound represented by the formula (1)

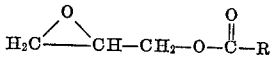

where R is an alkyl radical of 1 through 26 carbon atoms; and
(C) at least one organic diisocyanate.

UTILITY

These polyurethanes are useful as adhesives. They can, for example, be used to bind cloth to wood, wood to wood, vinyl to vinyl, metal to metal and glass to metal. They are also useful as pressure sensitive adhesives for tapes and wrappers. Because they are tacky at use temperatures and have rapid setting characteristics, and because they have excellent strength, resistance to degradation by water and flexibility when set, they are particularly useful as adhesives in the manufacture of shoes.

Their stability at application temperatures, normally 150–200° C., makes these polyurethanes better than those now used as shoe adhesives. In addition, the polyurethanes are soluble in common solvents such as methylethyl ketone. This makes it easy to impregnate porous materials, which then need only to be heated to activate their adhesive properties.

Preferred for their excellence as shoe adhesives are those polyurethanes which are reaction products of
(A) a mixture of an aliphatic dibasic acid of 2–36 carbon atoms and phthalic anhydride,
(B) a compound of the formula

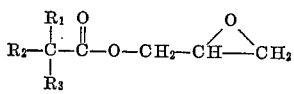

where $R_1$, $R_2$ and $R_3$ are saturated aliphatic chains containing a total of 7–9 carbon atoms, wherein at least one of $R_1$, $R_2$ and $R_3$ is a methyl group.
(C) 4,4′-diisocyanatodiphenyl methane.

Especially preferred for its excellence as a shoe adhesive is a polyurethane which is the reaction product of
(A) a mixture of azelaic acid and phthalic anhydride,
(B) a compound of Formula 1 wherein R is a branched alkyl radical of 8 through 10 carbon atoms, and
(C) 4,4′-diisocyanatodiphenyl methane.

HOW THE POLYURETHANES ARE MADE

Since the reactions for preparing the intermediate polyesters and the polyurethanes are fusion reactions, no water is given off and this permits the use of simple equipment. In addition, careful temperature control of the reaction is generally unnecessary because of the heat stability of the product.

The first step is preparation of a low molecular weight polyester. This is done by reacting 1 mol of the dibasic acid reactant (A) with 2 mols of the glycidyl ester reactant (B). If reactant (A) is a mixture of a dibasic acid and an anhydride, 1 mol of acid and 2 mols of anhydride are reacted with 4 mols of reactant (B).

Illustrative of the dibasic acids of group (A) which can be used are oxalic acid, succinic acid, adipic acid, azelaic acid and sebacic acid.

These reactants, in whatever proportions they are used, are placed in a reaction vessel, stirred, and heated to the proper reaction temperature, which is generally about 160° C. When the temperature reaches 160° C., heating is stopped and the reaction is allowed to proceed exothermically for about 1 hour, or until the viscosity of the reaction mass remains constant.

The resulting low molecular weight polyesters are viscous liquids, unique in their own right, and, when used at levels of from 2–80% by weight, useful as plasticizers for thermoplastic polymers.

These polyesters will react with any organic diisocyanate to form a polyurethane. The following list, which is merely illustrative and by no means exhaustive, shows such diisocyanates:

diphenylmethane-4,4′-diisocyanate,
diphenylene-4,4′-diisocyanate,
2,4-toluylene diisocyanate,
2,6-toluylene diisocyanate,
3,3′-dimethoxy-4,4′-diphenylene diisocyanate
   (dianisidine diisocyanate),
tetramethylene diisocyanate,
hexamethylene diisocyanate,
decamethylene diisocyanate,
ethylene diisocyanate,
ethylidene diisocyanate,
propylene-1,2-diisocyanate,
cyclohexylene-1,2-diisocyanate,
m-phenylene diisocyanate,
p-phenylene diisocyanate,
1,5-naphthalene diisocyanate,
3,3′-dimethyl-4,4′-biphenylene diisocyanate,
3,3′-dimethoxy-4,4′-biphenylene diisocyanate,
3,3′-diphenyl-4,4′-biphenylene diisocyanate,
4,4′-biphenylene diisocyanate,
3,3′-dichloro-4,4′-biphenylene diisocyanate,
furfurylidene diisocyanate,
bis-(2-isocyanatoethyl)fumarate.

To make a polyurethane, the intermediate polyester and a suitable diisocyanate, in a hydroxyl to isocyanate ratio of at least one to one, are placed in a reaction vessel. If it is more convenient, the polyester need not be removed from the vessel in which it was made; the diisocyanate can simply be added directly. This reaction mixture is then stirred, heated to 160–200° C. and held at that temperature until the viscosity of the reaction mass remains constant. The reaction is then complete.

A catalyst is not required for the reaction between the polyester and the diisocyanate. The reaction time, however, can be reduced and the color of the product improved by using from .0005% through 0.1%, by weight of the reaction mass, of a catalyst such as stannous octoate.

Generally speaking, the polyurethane product is a viscous mass which can be forced from the reaction vessel with an inert gas under pressure and cast into bricks or other shaped forms for convenience in handling and storage. The polyurethane hardens at room temperature to an amorphous solid which, in most cases, is transparent or amber in color.

HOW THE POLYURETHANES ARE USED AS ADHESIVES

Use of these polyurethanes as adhesives requires no new techniques or unusual equipment. The polyurethanes are simply heated to above their melting points, generally about 150° C., and are then conventionally applied to the articles to be bonded. The articles are placed together and the adhesive is allowed to set for 8 or 10 seconds. The assembled unit is then put into a press, where a pressure of from 60 to 80 pounds per square inch is applied for 20 to 30 seconds. The resulting bond is strong, tough, flexible, permanent, and resistant to water degradation.

The following illustrative examples show the invention in more detail. Those embodiments not specifically shown can be made by making appropriate reactant substitutions into the disclosed schemes. In the examples, all parts are by weight.

Example 1

Into a reaction vessel are charged

|  | Parts |
|---|---|
| Azelaic acid | 1055 |
| Phthalic anhydride | 1652 |
| Cardura E | 5582 |

The reactants are stirred and the mixture brought to a temperature of 160° C. Heating is then stopped and the reaction is allowed to proceed exothermically for about 1 hour.

To the resulting polyester intermediate are added 1702 parts of 4,4'-diisocyanatodiphenyl methane. Stannous octoate, (0.1 part) is then added and the mixture is stirred, brought to 160° C. and held at that temperature until viscosity remains constant. The resulting viscous polyurethane is poured into molds and cooled to give an amorphous, slightly elastomeric, light amber solid.

This material is heated to between 150 and 165° C. to melt it and is then applied to the edges of a synthetic rubber shoe sole. The sole is then immediately placed on a matching prewarmed leather shoe upper and the unit is clamped at a pressure of between 60 and 80 p.s.i. for 20 to 30 seconds. The pressure is then released and the operation is complete.

Example 2

Into a reaction vessel are charged

|  | Parts |
|---|---|
| Adipic acid | 1461 |
| Cardura E | 2400 |

These reactants are mixed and heated to 160° C. Heating is then stopped and the reaction is allowed to proceed exothermically until the viscosity of the reaction mass is constant and the acid number is 2 or less.

The resulting polyester intermediate is cooled to about 100° C. and 1740 parts of toluene diisocyanate and .01 part of stannous octoate are added. This mixture is stirred, heated to 160° C. and held at that temperature until the viscosity of the mass remains constant.

The polyurethane which results can be used as a shoe adhesive in the manner of Example 1.

Example 3

Into a reaction vessel are charged

|  | Parts |
|---|---|
| Terephthalic acid | 1660 |
| Cardura E | 2400 |

These reactants are stirred and heated to about 200° C. Heating is then stopped and the reaction is allowed to proceed exothermically for about ½ hour, at which point the mass has an acid number of about 2.

To the resulting viscous polyester are added 3000 parts of 4,4'-diisocyanatodiphenyl methane. This mass is stirred and kept at a temperature of 200° C. until its viscosity remains constant. The polyurethane which results is poured into molds and cooled.

The physical characteristics of this material are similar to those of the product of Example 1, except that it is somewhat more brittle. This makes it especially useful as a toe last adhesive in shoe manufacture. For this purpose it is applied in the same manner as the adhesive of Example 1.

Example 4

Into a reaction vessel are charged

|  | Parts |
|---|---|
| Isophthalic acid | 166 |
| Succinic anhydride | 118 |
| Cardura E | 960 |

These materials are mixed and heated to 160° C. Heating is then stopped and the rection is allowed to proceed exothermically until the reaction mass has an acid number of about 2.

To the resulting viscous polyester are then added 226 parts of bis-(2-isocyanatoethyl)fumarate. This mixture is stirred, heated to about 160° C. and kept at this temperature until the viscosity of the reaction mass becomes constant. The resulting polyurethane is poured into a mold and cooled to give a light-colored, soft, amorphous solid, more elastic than the product of Example 1.

Thirty parts of this polyurethane are dissolved in 70 parts of methylethyl ketone. Pieces of linen are impregnated with this solution and are then dried to give a material suitable for box-toe construction in shoes. The pieces are cut into the proper shape and are used by heating them in a suitable mold to a temperature of 120° C.

Although these examples show only the use of particular dibasic acids and diisocyanates, any of the others mentioned earlier can be used, in the same stoichiometric proportions as shown.

The claims are:
1. A polyurethane consisting essentially of the product of successively reacting
 (A) at least one of
  (1) a saturated aliphatic dibasic acid of 2 through 36 carbon atoms;
  (2) hexahydrophthalic acid;
  (3) a phthalic acid or a phthalic acid substituted with from 1 to 4 halogen atoms; or
  (4) mixtures of one or more of these acids with phthalic anhydride, succinic anhydride or dodecyl succinic anhydride;
 (B) at least one compound represented by the formula

where R is an alkyl group of 1 through 26 carbon atoms, the molar ratio of (A) to (B), when (A) is an acid, being about one (A) to about two (B), and when (A) is a mixture of acid and anhydride, being about one acid and about two anhydride to about four (B); and
 (C) at least one organic diisocyanate, compounds (B)

and (C) being used in a hydroxy/isocyanate ratio of at least 1/1.

2. A polyurethane according to claim 1 wherein
(A) is at least one of
(1) a saturated aliphatic dibasic acid of 2 through 36 carbon atoms;
(2) hexahydrophthalic acid;
(3) a phthalic acid or a phthalic acid substituted with from 1 to 4 halogen atoms; or
(4) mixtures of one or more of these with phthalic anhydride;
(B) is a compound represented by the formula

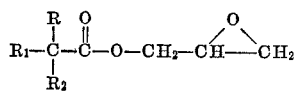

where $R_1$, $R_2$ and $R_3$ are saturated aliphatic chains containing a total of 7-9 carbon atoms, wherein at least one of $R_1$, $R_2$ and $R_3$ is a methyl group; and
(C) is 4,4'-diisocyanatodiphenyl methane.

3. A polyurethane according to claim 2 wherein (A) is a mixture of azelaic acid and phthalic anhydride.

References Cited

UNITED STATES PATENTS

| | | | |
|---|---|---|---|
| 2,567,842 | 9/1951 | Erickson | 260—348.6 |
| 2,779,783 | 1/1957 | Hayes | 260—485 |
| 3,012,984 | 12/1961 | Hudson | 260—31.2 |
| 3,184,439 | 5/1965 | Brack | 260—78.4 |
| 3,277,062 | 10/1966 | Goppel et al. | 260—78.4 |
| 3,300,420 | 1/1967 | Frey | 260—2.5 |
| 3,314,923 | 4/1967 | Muller et al. | 260—78 |
| 3,317,480 | 5/1967 | Fetscher et al. | 260—77.5 |
| 3,328,356 | 6/1967 | Brack | 260—77.5 |

FOREIGN PATENTS

| | | |
|---|---|---|
| 270,073 | 7/1964 | Netherlands. |
| 634,292 | 1/1962 | Canada. |
| 669,403 | 8/1963 | Canada. |
| 671,033 | 9/1963 | Canada. |
| 732,678 | 4/1966 | Canada. |

DONALD E. CZAJA, *Primary Examiner.*

H. S. COCKERAM, *Assistant Examiner.*

U.S. Cl. X.R.

117—121; 260—18, 29.1, 32.8, 75, 78.4